United States Patent [19]
Mori et al.

[11] 4,130,252
[45] Dec. 19, 1978

[54] SEAT BELT SYSTEM

[75] Inventors: Mamoru Mori, Okazaki; Mitsuo Inukai, Nagoya, both of Japan

[73] Assignees: Toyota Jidosha Kogyo Kabushiki Kaisha; Kabushiki Kaisha Tokai Rika Denki Seisakusho, both of Aichi, Japan

[21] Appl. No.: 818,301

[22] Filed: Jul. 25, 1977

[30] Foreign Application Priority Data

Aug. 2, 1976 [JP] Japan .............................. 51103420[U]

[51] Int. Cl.² .................. A62B 35/02; B65H 75/48
[52] U.S. Cl. .......................... 242/107.1; 242/107.4 R; 280/747
[58] Field of Search ........................... 242/107–107.7; 297/388; 280/744–747

[56] References Cited
U.S. PATENT DOCUMENTS

| | | | |
|---|---|---|---|
| 3,321,245 | 5/1967 | Christen | 297/388 |
| 3,351,382 | 11/1967 | Davies | 297/388 |
| 3,429,614 | 2/1969 | Huggins | 297/388 |
| 3,529,865 | 9/1970 | Atwell | 297/388 |
| 3,957,222 | 5/1976 | Bladh | 242/107 |
| 4,065,156 | 12/1977 | Tanaka et al. | 297/388 |

Primary Examiner—Harvey C. Hornsby
Assistant Examiner—John M. Jillions
Attorney, Agent, or Firm—Koda and Androlia

[57] ABSTRACT

A seat belt restraining system utilizing restraining belts which are wound up on a single retractor shaft one over the other. In the seat belt restraining system at least one of the restraining belts is provided along its entire length with a material which is more rigid than the restraining belt but which can also be bent so that the restraining belt can be wound up by a retractor mechanism.

8 Claims, 4 Drawing Figures

SEAT BELT SYSTEM

BACKGROUND OF THE INVENTION

1. Field of Invention

This invention relaes to seat belt systems and more particularly the seat belt systems in which the restraining belts are wound up on a single retractor shaft one over the other.

2. Prior Art

In conventional two belts retracting type seat belt systems in which a shoulder restraining belt and a lap restraining belt are wound up on a single retractor shaft one over the other when only one belt, i.e., the shoulder restraining belt, is pulled out, the remaining lap restraining belt is extended at the same time. However, since no pulling force is applied to the lap restraining belt, this belt will sometimes become slack inside the retractor case (as indicated by the broken line A in FIG. 1). When one of the restraining belts becomes slack inside the retractor case there is a danger that this slackened restraining belt will become stuck between the retractor shaft and the case of the retractor mechanism so that extension becomes impossible. Furthermore, there is also a danger that this slackened restraining belt will interfere with the operation of the emergency locking retractor mechanism. In addition to this, there is a further drawback that if the passenger is not careful while using such a system, slack will sometimes be generated in the restraining belts so that it is not sufficient to restrain the passenger, and this restraining condition is extremely dangerous. Furthermore, such slack in the restraining belts may also occur in systems other than the previously described two belts retracting type system.

This invention has been designed to eliminate these conventional technological defects.

SUMMARY OF THE INVENTION

Accordingly, it is a general object of the present invention to provide a seat belt restraining system in which the restraining belt can be smoothly extended and retracted without becoming slack inside the retractor case.

It is another object of the present invention to provide a seat belt system which is easy to manufacture, low in cost and reliable.

In keeping with the principles of the present invention, the objects are accomplished by a unique seat belt restraining system utilizing restraining belts which are wound up two belts on a single retractor shaft one over the other. In the seat belt restraining system of the present invention, at least one of the restraining belts is provided along its entire length with a material which is more rigid than the restraining belt, but which can also be bent so that the restraining belt can be wound up on a single retractor shaft one over the other. Typically, this material is a nylon film.

BRIEF DESCRIPTION OF THE DRAWINGS

The above mentioned features and objects will become more apparent by reference to the following description taken in conjunction with the accompanying drawings wherein like reference numerals denote like elements and in which.

DESCRIPTION OF THE INVENTION

Figure 1:
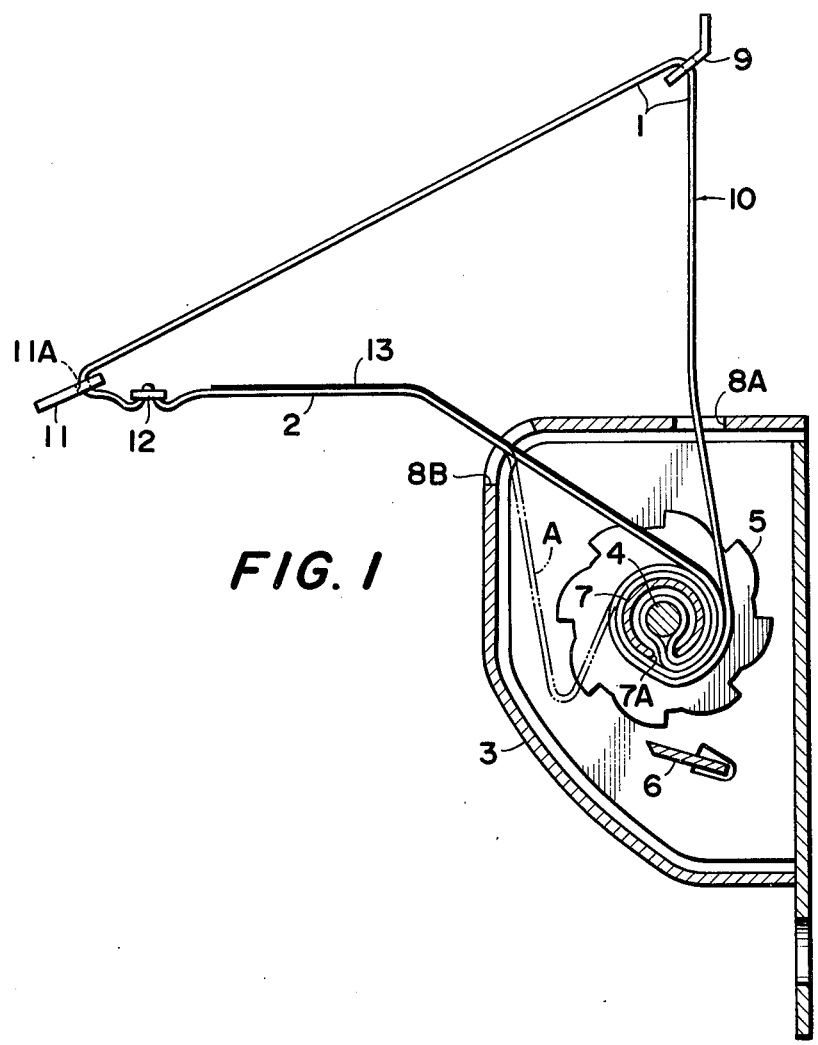
FIG. 1 is a cross-section which illustrates an embodiment of the seat belt system in accordance with the teachings of the present invention in which the essential parts have been enlarged.

Referring more particularly to the drawings, FIG. 1 illustrates an embodiment wherein the teachings of the present invention have been applied to a seat belt system of the so-called two belts retracting type. Referring to FIG. 1, the seat belt system includes a shoulder restraining belt 1 and a lap restraining belt 2 which are both parts of a single loop or endless webbing which forms a continuous restraining belt 10. A portion of continuous restraining belt 10 is fastened to a single retractor shaft 4 of the retractor mechanism. The retractor shaft 4 is powdered in the direction of retraction by a spring (not shown) and is provided with a ratchet wheel 5. A pawl 6, which is operated by an emergency locking retractor mechanism, is provided in the vicinity of ratchet wheel 5 such that it can engage the ratchet wheel 5. Furthermore, the retracted end of restraining belt 10 passes from the retractor shaft 4 through an opening 7A in the sleeve 7 and is wrapped around the circumference of the sleeve 7. Sleeve 7 is roughly C shaped in cross-section.

The restraining belt then branches out so that one portion is extended as a shoulder restraining belt 1 through shoulder restraining belt extension opening 8A into the interior of the vehicle while the other portion is extended as a lap restraining belt 2 through a lap restraining belt extension opening 8B into the interior of the vehicle. More precisely, the shoulder restraining belt 1 is extended vertically upward and passed through an eye in anchor 9. Shoulder restraining belt 1 then extends and passes through a belt passage 11A in tongue plate 11. Shorter restraining belt 2 then extends to tongue plate stopper 12 where lap restraining belt 2 begins.

Figure 2:
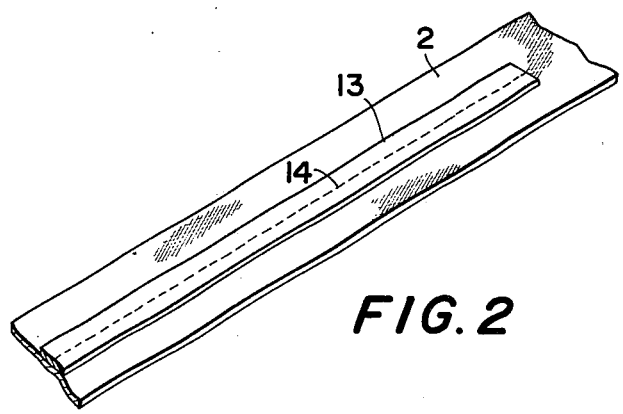
FIG. 2 is an oblique view of the essential features of one example of attachment of a nylon film in the embodiment of FIG. 1.
Figure 3:
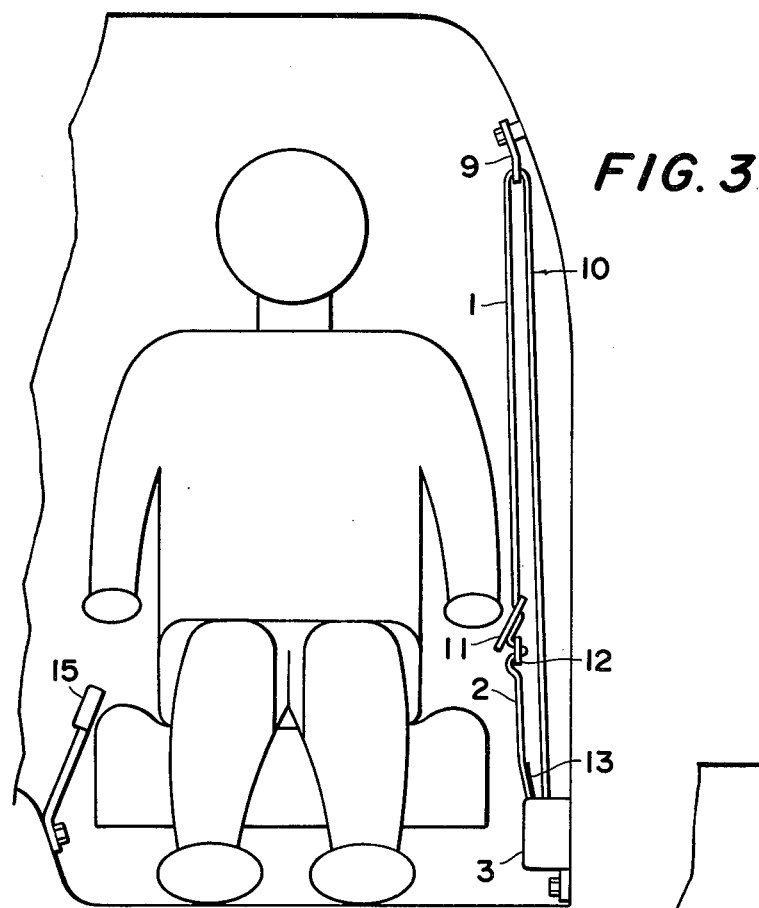
FIG. 3 is a front view illustrating the embodiment of FIG. 1 when the seat belt system is not in use.

A nylon film 13 whose rigidity is greater than that of the lap restraining belt 2, is sewn to the lap restraining belt 2 along its length by means of a length of thread (as shown in FIG. 2). The portion of the lap restraining belt 2 to which the nylon film 13 is attached extends from the portion which projects slightly into the interior of the vehicle from the retractor case 3 when the seat belt system is not in use (i.e., when the restraining belt 2 is partially stored inside the retractor mechanism 3 as shown in FIG. 3) to that portion immediately adjacent to the retractor shaft 4 of the retractor mechanism 3.

Figure 4:
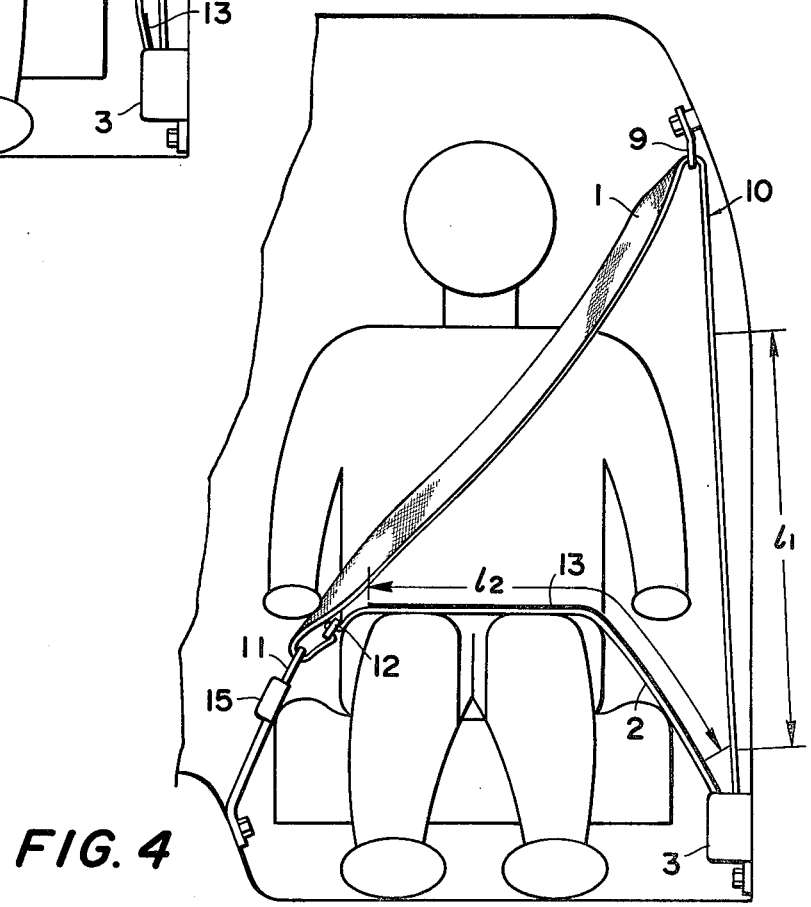
FIG. 4 is a front view showing the embodiment of FIG. 1 when the seat belt system is in use.

As shown in FIG. 4, when the seat belt system is in use, the tongue plate 11 is engaged with a buckle 15.

In operation, since nylon film 13 is attached to the the portion of the lap restraining belt 2 and has a function as bias means which extends from the portion that projects slightly into the interior of the vehicle from the retractor case 3 when the seat belt system is not in use to the portion that is immediately adjacent to the retractor shaft 4, the lap restraining belt 2 has a certain amount of rigidity. Accordingly, since the lap restraining belt 2 has a certain amount of rigidity, it will smoothly extend into the interior of the vehicle without becoming slack inside the retractor case 3 even if only the shoulder restraining belt 1 is pulled out.

After the shoulder and lap restraining belts 1 and 2 have been pulled out of the retractor case 3 and the tongue plate 11 has been engaged with buckle 15 (as shown in FIG. 4), the shoulder restraining belt will restrain the passenger's shoulders while the lap restraining belt 2 will restrain the passenger's lap. Here, since the shoulder restraining belt 1 and the lap restraining belt 2 are both extended by approximately the same amount, the tongue plate 11 and the nylon film 13 do not interfere with each other. The reason that the tongue plate will not interfere with the nylon film 13 is as follows: Since the shoulder restraining belt 1 and the lap restraining belt 2 are parts of a continuous restraining belt 10 and the restraining belt 10 is passed through anchor 9 and the tongue plate 11 in such a way that the restraining belt 10 is free to move, the extension length $l_1$ of shoulder restraining belt 1 and the extension length $l_2$ of the lap restraining belt 2 are approximately equal (as shown in FIG. 4). Accordingly, there is no bulge in that portion of the restraining belt 10 which is folded back at the tongue plate 11 or of damage to the film 13 due to the film 13 entering the tongue plate 11.

Furthermore, when the restraining belt 10 is retracted, the retractor shaft 4 of the retractor mechanism is caused to rotate in the direction of retraction of the force of the spring (not shown) so that both restraining belts 1 and 2 are smoothly retracted by retractor shaft 4.

In the above described embodiment, nylon film 13 was sewn to the lap restraining belt 2. However, this invention is not necessarily limited to just such an arrangement. For example, it is also within the scope of the present invention to weave nylon wire into the lap restraining belt 2. That is to say, it would be within the scope of the present invention to install any material which is substantially more rigid than the restraining belt, but which can also be bent, as an integral part of the restraining belt 10. Furthermore, this invention is not necessarily limited to the attachment of this material to the lap restraining belt 2. It would also be possible to attach such a material to the shoulder restraining belt 1 or to both the shoulder and lap restraining belts 1 and 2. Furthermore, the basic purpose of this invention could be achieved by attaching this material to the restraining belts 1 and 2 in an intermittent fashion. In addition, although the above described embodiment consists of an application of this invention to the so-called two belts retracting type seat belt system, it is within the scope of this invention that it could be applied to other types of systems, such as systems in which a single restraining belt is retracted by a single retractor shaft.

Thus, as has been described above in connection with this invention, the restraining belts are smoothly extended and retracted without becoming slack inside the retractor case. Accordingly, this invention has the superior effect of being able to securely restrain the passenger.

In all cases it is understood that the above described embodiment is merely illustrative of but one of the many possible specific embodiments which can represent applications of the principles of the present invention. It should be apparent to one skilled in the art that numerous and varied other arrangements can be readily devised in accordance with these principles by those skilled in the art without departing from the spirit and scope of the invention.

We claim:

1. A seat belt retractor system for retracting two seat belts into a single retractor, comprising:
   a retractor case;
   a base provided within said retractor case;
   a retractor shaft rotatably supported by said base;
   two seat belts coupled to said retractor shaft and wound one over the other such that one seat belt is an inner side seat belt and one is an outer side seat belt and extendable from said retractor case; and
   a bias means coupled to substantially the total length of said inner side seat belt, said bias means being more rigid than said seat belt but being sufficiently flexible to be wound up on said retractor shaft with said seat belt whereby said seat belt can be smoothly extended and retracted without becoming slack within said retractor case.

2. A seat belt retractor system according to claim 1, wherein said bias means is a nylon film.

3. A seat belt retractor system according to claim 1, wherein said bias means is continuous along the length of said inner side seat belt.

4. A seat belt retractor system for winding up two seat belts on a single retractor shaft one over the other, comprising:
   a retractor case;
   a base provided within said retractor case;
   a retractor shaft rotatably supported by said base;
   two seat belts coupled to said retractor shaft and extendable and retractable from said retractor case, said seat belts forming an inner side and an outer side seat belt; and
   a bias means coupled to substantially the total length of said inner side seat belt, said bias means being more rigid than said seat belt but being sufficiently flexible to be wound up on said retractor shaft with said seat belts whereby said seat belts can be smoothly extended and retracted without becoming slack within said retractor case.

5. A seat belt retractor system according to claim 4 wherein said bias means is a nylon film.

6. A seat belt retractor system according to claim 5 wherein said nylon film is normally straight.

7. A seat belt retractor system according to claim 4 wherein said bias means is continuous along the length of said inner side seat belt.

8. A seat belt retractor system according to claim 4 wherein both seat belts are formed from a continuous belt.

* * * * *